US006369754B1

(12) United States Patent
Levanon

(10) Patent No.: US 6,369,754 B1
(45) Date of Patent: Apr. 9, 2002

(54) FINE POSITIONING OF A USER TERMINAL IN A SATELLITE COMMUNICATION SYSTEM

(75) Inventor: Nadav Levanon, Ramat-Gan (IL)

(73) Assignee: Qualcomm Inc., San Diego, CA (US)

( * ) Notice: Subject to any disclaimer, the term of this patent is extended or adjusted under 35 U.S.C. 154(b) by 0 days.

(21) Appl. No.: 09/536,262

(22) Filed: Mar. 27, 2000

Related U.S. Application Data

(60) Provisional application No. 60/127,623, filed on Apr. 1, 1999.

(51) Int. Cl.[7] .............................. G01S 5/02; H04B 7/185
(52) U.S. Cl. .............................. 342/357.16; 342/357.02
(58) Field of Search ................... 342/357.16, 357.05, 342/357.02; 701/214

(56) References Cited

U.S. PATENT DOCUMENTS

| | | | |
|---|---|---|---|
| 4,445,118 A | | 4/1984 | Taylor et al. |
| 4,797,677 A | | 1/1989 | MacDoran et al. |
| 4,819,053 A | | 4/1989 | Halvais |
| 4,987,420 A | | 1/1991 | Inamiya |
| 5,041,833 A | * | 8/1991 | Weinberg |
| 5,105,198 A | | 4/1992 | Inamiya |
| 5,126,748 A | | 6/1992 | Ames et al. |
| 5,412,389 A | | 5/1995 | Olds |
| 5,420,592 A | | 5/1995 | Johnson |
| 5,463,400 A | | 10/1995 | Tayloe |
| 5,500,648 A | | 3/1996 | Maine et al. |
| 5,543,813 A | | 8/1996 | Araki et al. |
| 5,548,801 A | | 8/1996 | Araki et al. |
| 5,552,795 A | | 9/1996 | Tayloe et al. |
| 5,557,284 A | | 9/1996 | Hartman |
| 5,566,354 A | | 10/1996 | Sehloemer |
| 5,617,317 A | | 4/1997 | Ignagni |
| 5,619,525 A | | 4/1997 | Wiedeman et al. |
| 5,634,190 A | | 5/1997 | Wiedeman |
| 5,644,572 A | | 7/1997 | Olds et al. |
| 5,666,648 A | | 9/1997 | Stuart |
| 5,732,387 A | * | 3/1998 | Armbruster et al. ........ 701/206 |
| 5,861,843 A | * | 1/1999 | Sorace et al. ............... 342/372 |

FOREIGN PATENT DOCUMENTS

| | | |
|---|---|---|
| EP | 0546758 | 12/1992 |
| EP | 0582073 | 6/1993 |
| EP | 0856957 | 8/1998 |
| WO | 8801392 | 2/1988 |
| WO | 9621162 | 7/1996 |

OTHER PUBLICATIONS

Levanon, Nadav, Quick Position Determination Using 1 or 2 LEO Satellites, Ieee Transactions On Aerospace and Electronic Systems, US, Ieee Inc. New York, vol. 34, No. 3, Jul. 1, 1998, pp. 736–754, XP000771655.

* cited by examiner

*Primary Examiner*—Theodore M. Blum
(74) *Attorney, Agent, or Firm*—Philip R. Wadsworth; Gregory D. Ogrod

(57) ABSTRACT

An improved method for determining the location of a user terminal with a high degree of accuracy. By repeating N times the basic active positioning measurement sets, a much better accuracy is reached that will be of value to the user. According to the method of the present invention, the user makes a position call. A position call prompts a gateway to establish a traffic channel on which a positioning message will yield the basic set of measurements: round-trip delay and round-trip Doppler in single-satellite positioning, and the addition of delay-difference and Doppler difference to a second satellite in two-satellite positioning. The accumulated measurements are used to determine position and theoretical error. The call is terminated when an accuracy threshold is reached or a time limit has expired. The user terminal receives a position message or a failure message.

28 Claims, 7 Drawing Sheets

FINE POSITIONING OF A USER TERMINAL IN A SATELLITE COMMUNICATION SYSTEM

This application claims benefit of provision No. 60/127,623, Apr. 1, 1999.

BACKGROUND OF THE INVENTION

I Field of the Invention

The present invention relates generally to satellite communication systems and networks. More particularly, the present invention relates to determining the location of mobile stations relative to satellites, with higher accuracy.

II Related Art

A typical satellite-based communications system comprises at least one terrestrial base station (hereinafter referred to as a gateway), at least one user terminal (for example, a mobile telephone), and at least one satellite for relaying communications signals between the gateway and the user terminal. The gateway provides links from a user terminal to other user terminals or communications systems, such as a terrestrial telephone system.

Mobile user terminals have enabled users to take their communication capabilities wherever they go. This imposes a burden on a satellite based communications system carrier of determining the location of the user terminal. The need for user terminal position information stems from several considerations. One consideration is that the system should select an appropriate gateway for providing the communications link. One aspect of this consideration is allocation of a communications link to the proper service provider (for example, a telephone company). A service provider is typically assigned a particular geographic territory, and handles all calls with users in that territory. When communications are required with a particular user terminal, the communications system can allocate the call to a service provider based on the territory within which the user terminal is located. This may include allocation to a gateway servicing that territory. In order to determine the appropriate territory, the communications system requires the position of the user terminal. A similar consideration arises when calls must be allocated to service providers based on political boundaries or contractual services.

Many mobile telephone users of satellite-based communications systems also desire to know their user terminal position. For example, a mobile telephone user, camping in the woods, becomes lost or unsure of a location or distance from a desired destination. In addition to making an emergency phone call for help or direction assistance, the mobile telephone user would like to be provided with user terminal position information. Such information may aid mobile telephone users in finding their own way to either safety or a desired location.

Presently, user terminal position information is obtained for communication system use only. Error specifications for current communication systems require that user terminal position information be determined within an accuracy of ten kilometers. An error of ten kilometers may be sufficient for system operations, but is generally insufficient if user terminal position information is being supplied to a user, especially for emergency purposes. User terminal position information must be provided with sufficient accuracy to be meaningful to the user.

Several methods of determining the location of the user terminal involve measuring the distance (range) between the user terminal and the satellite and the rate of change of that distance (range rate). When these measurements are combined with other data, such as the position of the satellite, the location of the user terminal can be determined. Techniques for determining user terminal location using satellite-user terminal range and range rate are disclosed in commonly-owned, application Serial Nos. 8/723,751, entitled "Position Determination Using One Low-Earth Orbit Satellite;" 08/723,725, entitled "Unambiguous Position Determination Using Two Low-Earth Orbit Satellites;" 09/150,500, entitled "Accurate Range And Range Rate Determination In A Satellite Communication System;" and 09/150,077, entitled "Fast User Terminal Position Determination In A Satellite Communications System," each being incorporated herein by reference.

In the above-described patent applications, the accuracy of determining the distance (range) between one or more satellites and a user terminal is a few kilometers for one satellite positioning, and approximately 500 meters for two satellite positioning. By the year 2001, the Federal Communications Commission (FCC) in the United States has required that the location of a person making an emergency "911" call be determined to within 125 meters. Similar requirements may be the subject of governmental action in other countries. In addition, other types of requests for assistance are also generally viewed as being better addressed with improved accuracy in position determination. Some commercial services of a non-emergency nature also desire improved location accuracy.

What is needed is a system and method for allowing a user to make a position call to receive useful user terminal position information. What is further needed is a system and method for obtaining more accurate measurements, which will in turn yield a more accurate determination of the location of a user terminal to within 125 meters to satisfy FCC emergency 911 call, and other, user position requirements.

SUMMARY OF THE INVENTION

The present invention satisfies the above mentioned needs by providing an improved system and method for determining the location of a user terminal with a high degree of accuracy. The present invention uses fine positioning to determine the location of a user terminal in a satellite communications system. Fine positioning is defined as higher accuracy positioning. Fine positioning provides an improved accuracy that is of value to the user by repeating N times the basic active positioning measurement sets during a position call, extending measurements based on a change in geometry, and adding a reference user terminal for providing differential correction.

According to the method of the present invention, the user makes a position call. A position call prompts a gateway to establish a traffic channel on which a positioning message will yield the basic set of measurements: round-trip delay and round-trip Doppler in single-satellite positioning, and the addition of delay-difference and Doppler difference to a second satellite in two-satellite positioning. The accumulated measurements are used to determine position and theoretical error. The call is terminated when an accuracy threshold is reached or a time limit has expired. The user terminal receives a position message or a failure message.

Further embodiments, features, and advantages of the present invention, as well as the structure and operation of the various embodiments of the present invention, are described in detail below with reference to the accompanying drawings.

BRIEF DESCRIPTION OF THE DRAWINGS

The features, objects, and advantages of the present invention will become more apparent from the detailed description set forth below when taken in conjunction with the drawings in which like reference characters identify corresponding elements throughout. In the drawings, like reference numbers generally indicate identical, functionally similar, and/or structurally similar elements. The drawings in which an element first appears is indicated by the leftmost digit(s) in the corresponding reference number.

DETAILED DESCRIPTION OF THE PREFERRED EMBODIMENTS

While the present invention is described herein with reference to illustrative embodiments for particular applications, it should be understood that the invention is not limited thereto. Those skilled in the art with access to the teachings provided herein will recognize additional modifications, applications, and embodiments within the scope thereof and additional fields in which the present invention would be of significant utility.

Introduction

The present invention is a system and method for accurately determining the location of a user terminal in a satellite communications system. The present invention uses fine positioning to determine the location of the user terminal. Fine positioning provides improved accuracy by utilizing repeated measurements of basic active positioning measurement sets, extended measurements based on a change in geometry, and a reference user terminal for providing differential correction. The method employed by fine positioning provides higher accuracy positioning of the user terminal by mitigating random errors as well as bias errors.

The present invention is particularly suited for use in communications systems employing low Earth orbit (LEO) satellites. However, as would be apparent to one skilled in the relevant art, the concept of the present invention can also be applied to satellite systems in which the satellites travel in non-LEO orbits, and some other systems having moving signal sources. Before discussing the embodiments of the present invention, a typical environment in which the invention can operate is presented.

A Typical Satellite Communications System

Figure 1:
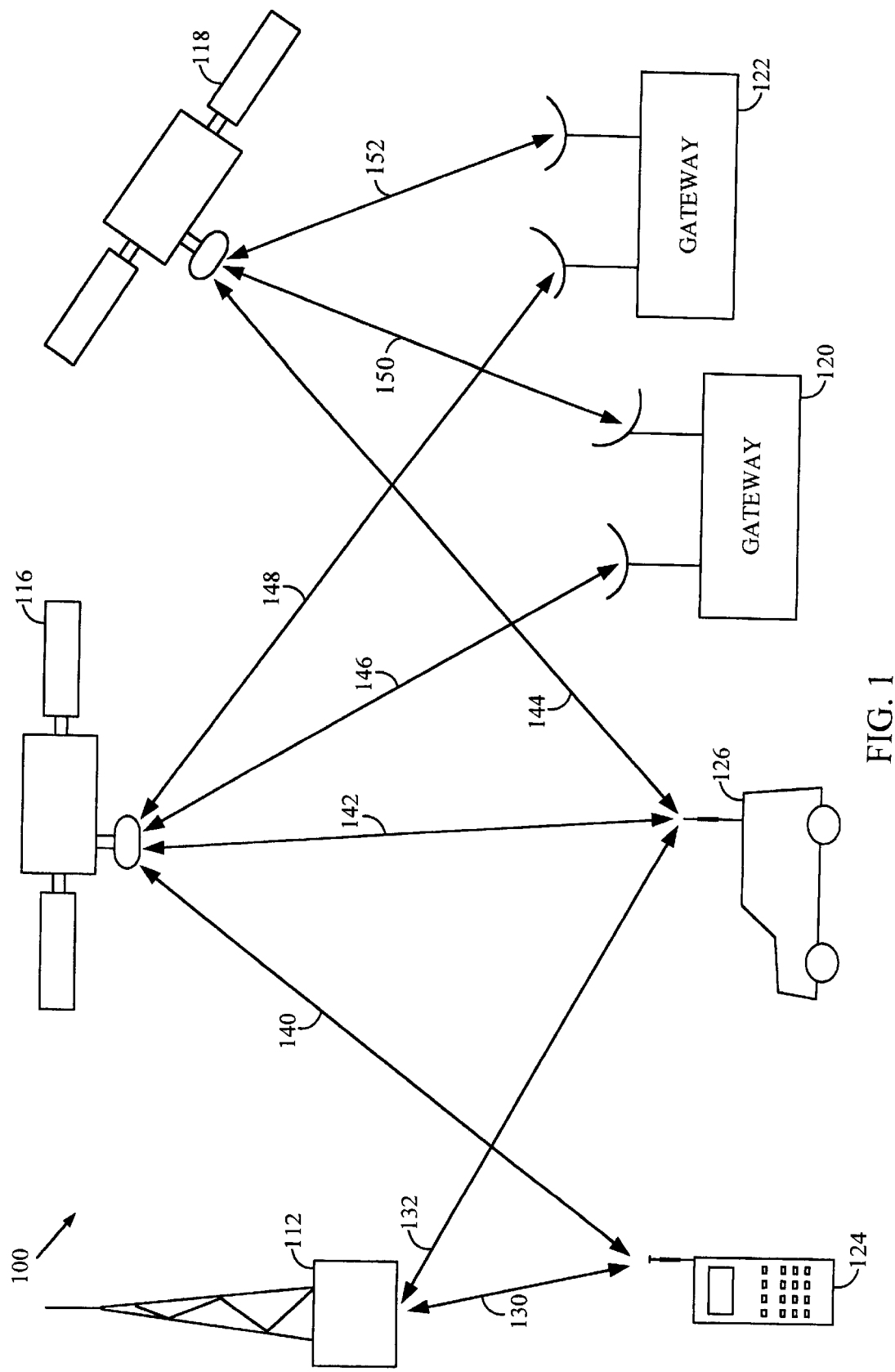
FIG. 1 is a diagram illustrating an exemplary wireless communications system in which the present invention is useful.

An exemplary wireless communication system in which the present invention is useful is illustrated in FIG. 1. It is contemplated that this communications system uses code division multiple access (CDMA) type communication signals, but this is not required by the present invention. In a portion of a communications system 100 illustrated in FIG. 1, one base station 112, two satellites 116 and 118, and two associated gateways or hubs 120 and 122 are shown for effecting communications with two remote user terminals 124 and 126. Typically, the base stations and satellites/gateways are components of separate communications systems, referred to as being terrestrial and satellite-based, although this is not necessary. The total number of base stations, gateways, and satellites in such systems depends on desired system capacity and other factors well understood in the art.

User terminals 124 and 126 each include a wireless communication device such as, but not limited to, a wireless telephone, a data transceiver, or a paging or position determination receiver, and can be hand-held or vehicle-mounted as desired.

Generally, beams from satellites 116 and 118 cover different geographical areas in predefined patterns. Beams at different frequencies, also referred to as CDMA channels or "sub-beams," can be directed to overlap the same region. It is also readily understood by those skilled in the art that beam coverage or service areas for multiple satellites, or antenna patterns for multiple base stations, might be designed to overlap completely or partially in a given region depending on the communications system design and the type of service being offered, and whether space diversity is being achieved.

A variety of multi-satellite communication systems have been proposed with an exemplary system employing on the order of 48 or more satellites, traveling in eight different orbital planes in LEO orbits for servicing a large number of user terminals. However, those skilled in the art will readily understand how the teachings of the present invention are applicable to a variety of satellite system and gateway configurations, including other orbital distances and constellations.

In FIG. 1, some possible signal paths are illustrated for communications being established between user terminals 124 and 126 and base station 112, or through satellites 116 and 118, with gateways 120 and 122. The base station-user terminal communication links are illustrated by lines 130 and 132. The satellite-user terminal communication links between satellites 116 and 118, and user terminals 124 and 126 are illustrated by lines 140, 142, and 144. The gateway-satellite communication links, between gateways 120 and 122 and satellites 116 and 118, are illustrated by lines 146, 148, 150, and 152. Gateways 120 and 122, and base station 112, may be used as part of one or two-way communications systems or simply to transfer messages or data to user terminals 124 and 126.

For ease of discussion of the signal paths described above, the following convention is adopted in this disclosure. Signals transmitted from a gateway to a satellite are referred to as the "forward uplink." Signals transmitted by a satellite to a user terminal are referred to as the "forward downlink." The forward uplink and forward downlink are referred to collectively as the "forward link." Signals transmitted from a user terminal to a satellite are referred to as the "reverse uplink." Signals transmitted by a satellite to a gateway are referred to as the "reverse downlink." The reverse uplink and reverse downlink are referred to collectively as the "reverse link."

The preferred embodiment of the invention is discussed in detail below. While specific steps, configurations and arrangements are discussed, it should be understood that this is done for illustrative purposes only. A person skilled in the relevant art will recognize that other steps, configurations and arrangements can be used without departing from the spirit and scope of the present invention. The present invention could find use in a variety of wireless information and communication systems, including those intended for position determination. A preferred application is in CDMA wireless spread spectrum communication systems for telephone service.

Overview of Fine Positioning

The present invention is a system and method for accurately determining the location of a user terminal in a satellite communications system. The present invention uses fine positioning to determine the location of a user terminal. Fine positioning provides higher accuracy positioning. Fine positioning can be requested by a gateway or a user terminal by initiating a position call. A position call is a special call dedicated to requesting higher accuracy positioning of a user terminal. For example, an emergency "911" call can be treated as a position call. Position calls are approximately 20–120 seconds in length. Position calls are made by dialing a specific number, numerical sequence, or code, or by pushing a dedicated button or set of buttons, or through a menu selection process on a user terminal.

The method employed by fine positioning utilizes repeated measurements of basic active positioning measurement sets (i.e., single satellite positioning and two satellite positioning) to mitigate random errors, extended measurements based on a change in geometry to mitigate random and bias errors, and a reference user terminal to mitigate bias errors. Techniques for determining the location of a user terminal using satellite-user terminal range and range-rate are disclosed in the above-mentioned '751 and '725 applications, which are incorporated by reference herein in their entirety. Other techniques for determining the location of a user terminal using satellite-user terminal range and range-rate are disclosed in the above mentioned patent applications entitled, "Accurate Range And Range Rate Determination In A Satellite Communications System," and "Fast User Terminal Position Determination In A Satellite Communications System."

Fine Positioning Based on Repeated and Extended Measurements

Fine positioning uses repeated measurements of the basic active positioning measurement sets (i.e., single satellite positioning and two satellite positioning) to mitigate random errors. Independent random errors are errors caused by thermal noise. During a position call, measurements are repeated over a period of up to approximately two minutes. Repeating the same measurements N times reduces position error, due to random measurement error, by $1/\sqrt{N}$.

Single Satellite Positioning

In single satellite positioning, initial random measurement error is relatively high. As previously stated, position error is reduced by $1/\sqrt{N}$ when the same measurements are repeated N times. A reduction in position error beyond $1/\sqrt{N}$ can also be achieved from a change in geometry between a satellite, gateway, and user terminal during the total measurement time or interval. During a position call, here two minutes, a satellite change its position, which results in a new geometry. The change in geometry during a total measurement time T (with $T=(N-1)\delta t$, where $\delta t$ is the time interval between measurements and N is the number of repeated measurements) adds considerably more information and a further reduction of error by more than $1/\sqrt{N}$.

Figure 2A:
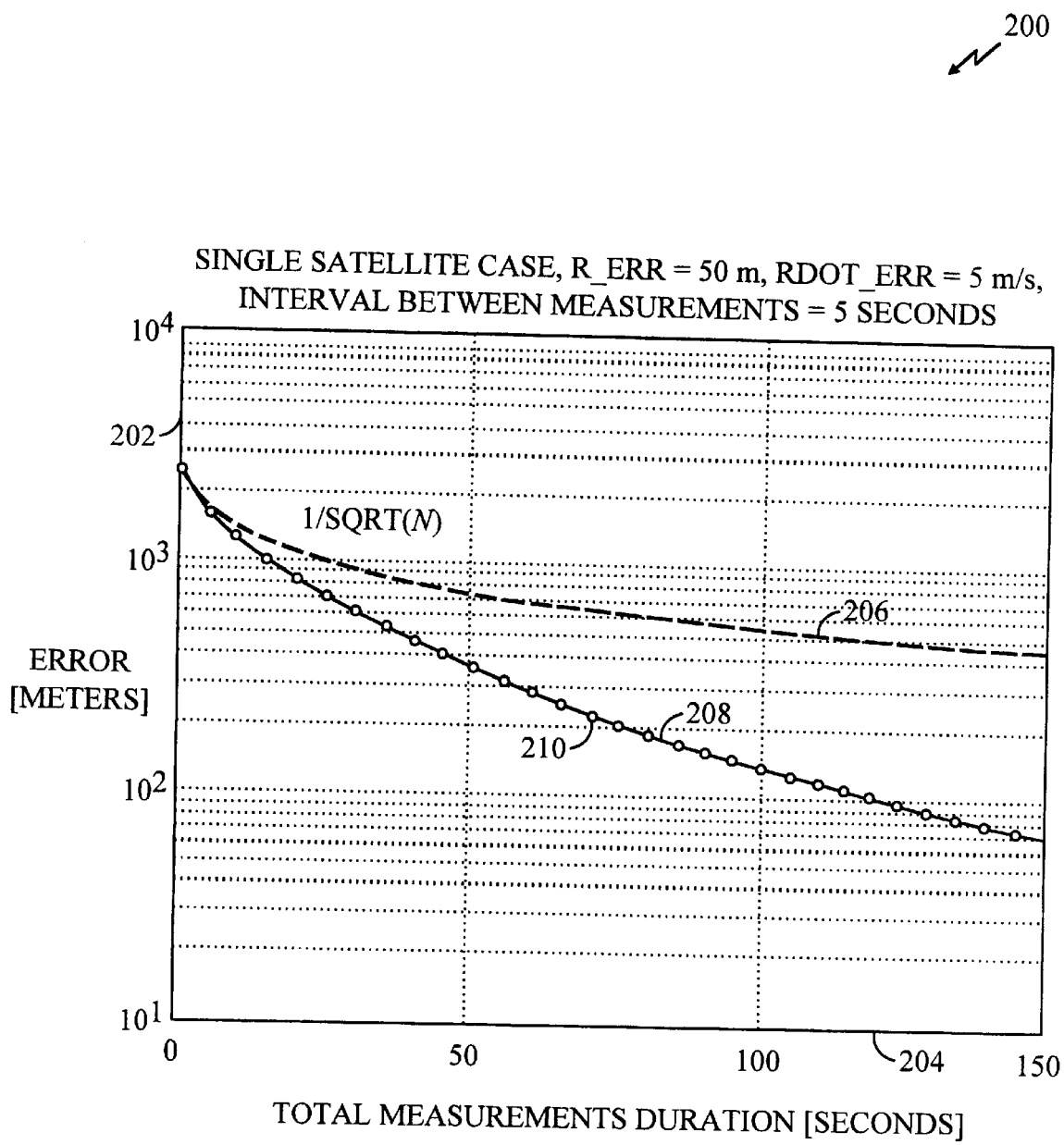
FIG. 2A is a graphical representation of random error versus total measurement duration for single satellite fine positioning.

FIG. 2A is an exemplary graphical representation of random error versus total measurement duration for single satellite fine positioning. A graph 200 comprises a logarithmic y-axis scale 202 representing random error in meters, an x-axis 204 representing total measurement duration in seconds, a dashed-line 206 representing the improvement in random error due to the reduction in position error by $1/\sqrt{N}$ where N equals 30, and a solid-line 208 with circles 210 representing the improvement in random error due to extended measurements (i.e., including the effect of a change in geometry). Circles 210 represent the interval between measurements. The time interval between measurements for solid-line graph 208 is five (5) seconds and extends to 150 seconds or 2.5 minutes.

At time t=0, graph 200 begins with an initial random error of 2.5 kilometers. At time t=150 seconds, the random error due to $1/\sqrt{N}$ falls to approximately 0.45 kilometers, as shown by dashed-line 206. At time t=150 seconds, a further reduction in random error is experienced when repetitive extended measurements are employed. Solid-line 208 shows a further reduction in random error to approximately 70 meters due to both the repetition in the measurements and the change in geometry.

Figure 2B:
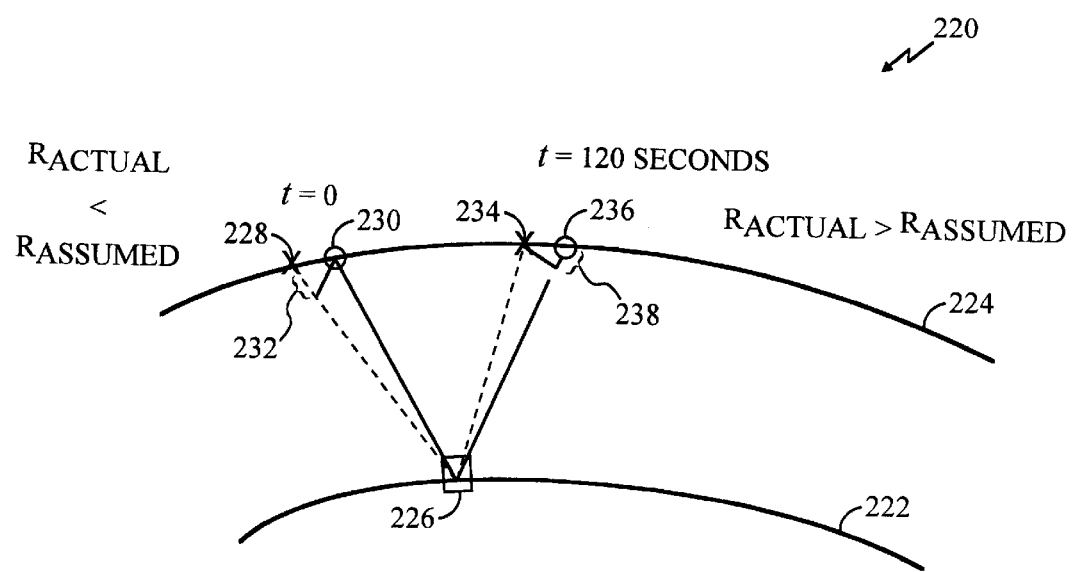
FIG. 2B is an exemplary satellite communications system depicting how a change in geometry over a measurement duration helps to reduce bias errors.

Bias errors are errors caused by something that is fixed or internal. Similar bias errors occur in neighboring measurements, and are, thus, hard to improve. A change in geometry also helps to reduce bias errors in satellite positioning. An exemplary satellite communications system depicting how a change in geometry over a two-minute measurement duration helps to reduce bias errors in satellite positioning is shown in FIG. 2B. Exemplary satellite communications system 220 comprises, inter alia, a first curved line representing a partial circumference of the earth's surface 222 and a second curved line representing the orbital path of a satellite 224. A mobile telephone 226 (user terminal) is located on the earth's surface. The orbital path of satellite 224 includes an assumed satellite position 228 at time t=0 seconds, a true satellite position 230 at time t=0 seconds, an error 232 resulting from the difference between the assumed and true satellite positions at time t=0 seconds, an assumed satellite position 234 at time t=120 seconds, a true satellite position 236 at time t=120 seconds, and an error 238 resulting from the difference between the assumed and true satellite positions at time t=120 seconds.

Initially, at time t=0 seconds, the satellite is assumed to be at location 228, but is actually at location 230. Thus, the actual range is shorter than the assumed range, resulting in a negative error 232. Assuming the satellite is moving at 7 kilometers/second, at time t=120 seconds, the satellite has moved 840 kilometers. At time t=120 seconds, the satellite is assumed to be at location 234, but is actually at location 236. Thus, the actual range is longer than the assumed range, resulting in a positive error 238.

Information or compensation is gained from the along track position of the satellite position. By averaging negative error 232 with positive error 238, bias errors in the along track position are mitigated.

Ambiguities may exist in single satellite fine positioning. Ambiguities arise when it cannot be determined as to which side of the satellite track a user terminal is located. Initial ambiguity resolution uses two quick-positioning methods. The first method views historical data from a second satellite, if available. The second method uses satellite beam information. Initial ambiguity methods can fail if the user terminal is near the satellite sub-track (<300 kilometers).

Figure 2C:
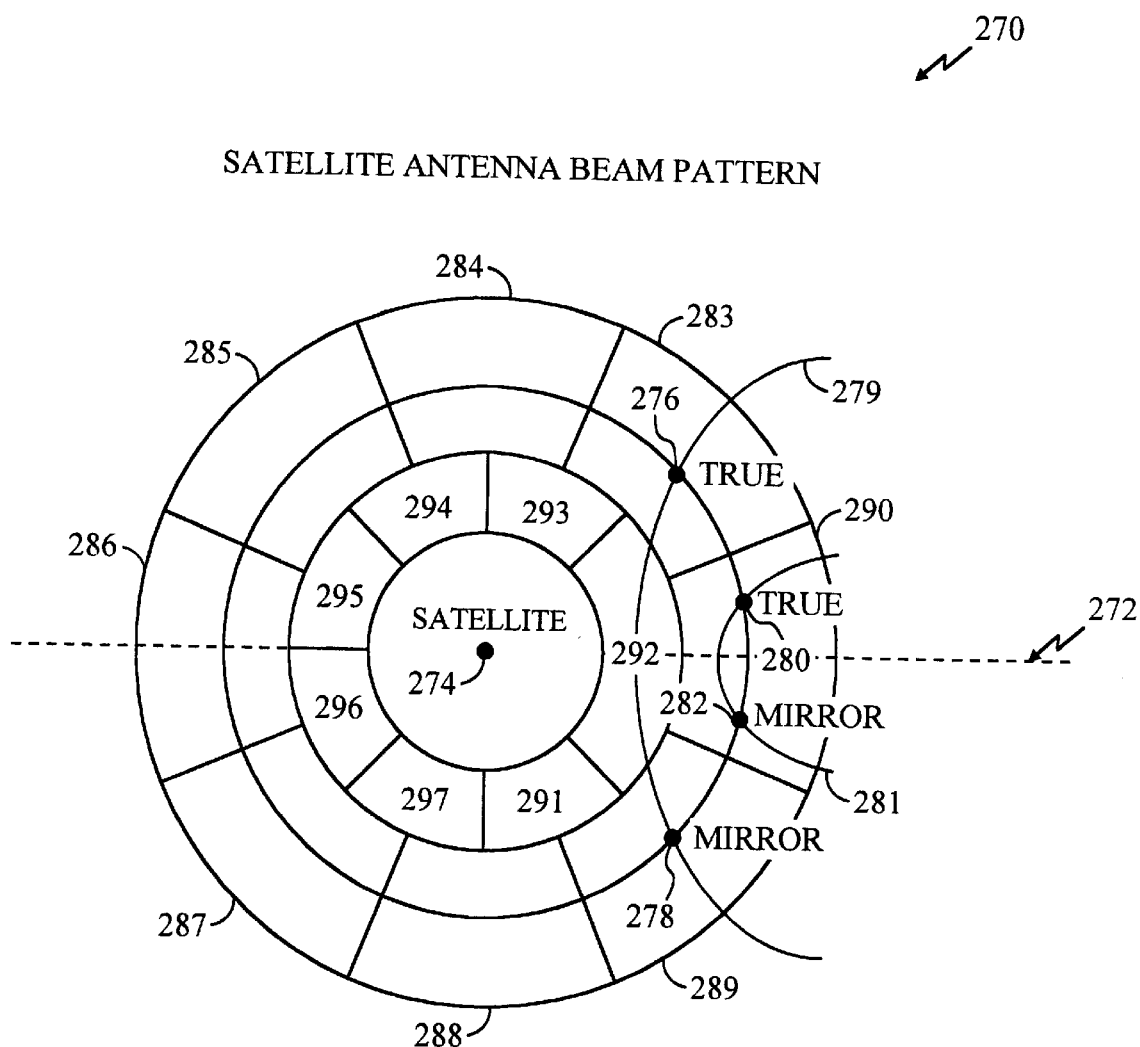
FIG. 2C is a diagram illustrating a satellite antenna beam pattern depicting ambiguity problems in single satellite positioning.

FIG. 2C is a diagram illustrating a satellite antenna beam pattern depicting ambiguities in single satellite positioning. A satellite antenna beam pattern 270 comprises a satellite track 272, a satellite 274, a plurality of satellite antenna beams 283–297, a first hyperbola 279, and a second hyperbola 281. First hyperbola 279 includes a true user terminal position 276 and a mirror user terminal position 278. Second hyperbola 281 includes a true user terminal position 280 and a mirror user terminal position 282.

True user terminal position 276 of first hyperbola 279 lays in a different satellite beam from mirror user terminal position 278. The correct position of a user terminal can be resolved by knowing within which beam 283–297 the user terminal is actually located. Knowing that true user terminal position 276 lays within satellite beam 283 and not satellite beam 289 eliminates the ambiguous mirror user terminal position 278 as the correct position of the user terminal. When the true and mirror positions fall within the same beam, ambiguities cannot be resolved using satellite beam information. True user terminal position 280 and mirror user terminal position 282 of second hyperbola 281 both lay within satellite beam 290. Therefore, the actual user terminal location cannot be resolved using satellite beam information.

Extended measurements, available in single satellite positioning, provide additional information that can aid in resolving ambiguities. The added information is not symmetrical with respect to both the true and mirror solutions due to the rotation of the Earth during the extended measurement period. The resolution technique used, observes the patterns of the residuals after solving for both the true position and the mirror position using all of the accumulated measurements.

Residuals are the differences between the actual measurements and the noise-free measurements used to calculate the estimated position. The residuals of the true solution will fluctuate randomly around zero (unless there is a strong source of bias error). The residuals of the mirror solution will fluctuate randomly around a characteristic curve (range residuals—parabola, range-rate residuals—ramp).

A new satellite may join or replace the first satellite during an extended measurement period. That is, the user terminal may change which satellites it communicates with or transfers signals through as different satellites come into or drop out of view. Satellite handoff and other events also effect this process. A new satellite that joins during the extended measurement period converts single satellite positioning to two-satellite positioning. For example, a position call may start with a single satellite. During the call, a second satellite may appear, producing two-satellite positioning. At a later time during the call, the first satellite may hand off to the second satellite, resulting in the return to single satellite positioning. Measurements accumulated from two different satellites during single satellite fine positioning, whether partially overlapping in time or not overlapping at all, yield positioning performances comparable to two-satellite fine positioning. Ambiguities are non-existent with two-satellite positioning.

Two-Satellite Positioning

For two-satellite positioning, most of the geometry benefit is already in the first measurement. The initial error is generally much smaller than in the single satellite case. Thus, for two-satellite fine positioning, the error improvement is a result of repeating the same measurements N times to reduce position error by $1/\sqrt{N}$.

Figure 2D:
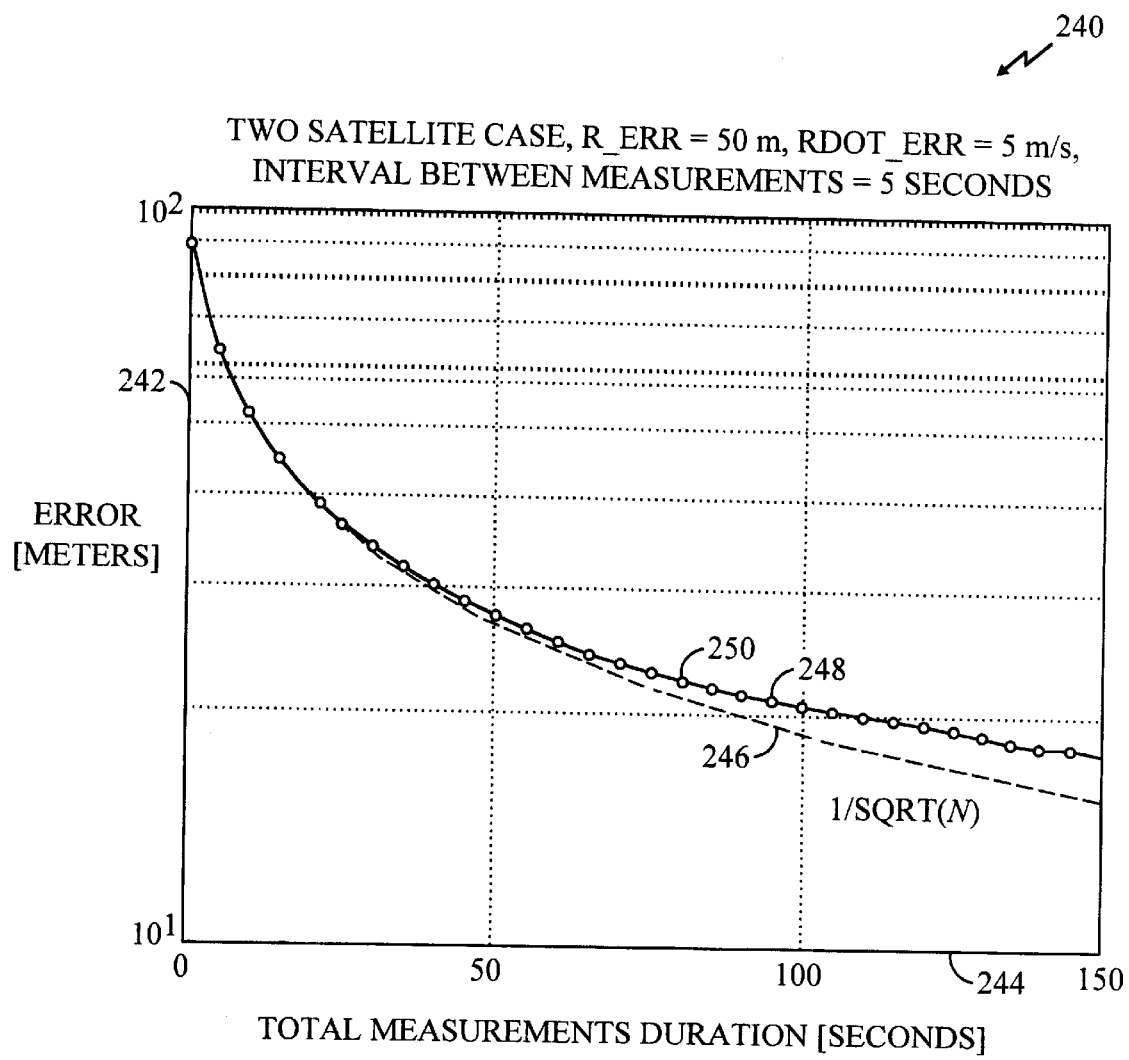
FIG. 2D is a graphical representation of random error versus total measurement duration for two-satellite fine positioning.

FIG. 2D is a graphical representation of random error versus total measurement duration for two-satellite fine positioning. A graph 240 comprises a logarithmic y-axis scale 242 representing random error in meters, an x-axis 244 representing total measurement duration in seconds, a dashed-line graph 246 representing the improvement in random error due to the reduction in position error by $1/\sqrt{N}$, where N is equal to or less than 30, and a solid-line graph 248 with circles 250 representing the improvement in random error due to extended measurements (i.e., a change in geometry). Circles 250 represent the interval between measurements. The time interval between measurements for solid-line graph 248 is five (5) seconds and extends to 150 seconds or 2.5 minutes. At time t=0, graph 240 begins with an initial random error of 90 meters. At time t=150 seconds, the random error due to $1/\sqrt{N}$ falls to approximately 16 meters, as shown in dashed-line graph 246. Note that at time t=150 seconds, a lesser reduction in random error is experienced with extended measurements. Solid-line graph 248 experiences a lesser reduction in random error of approximately 19.

Reference User Terminal for Fine Positioning

Figure 3:
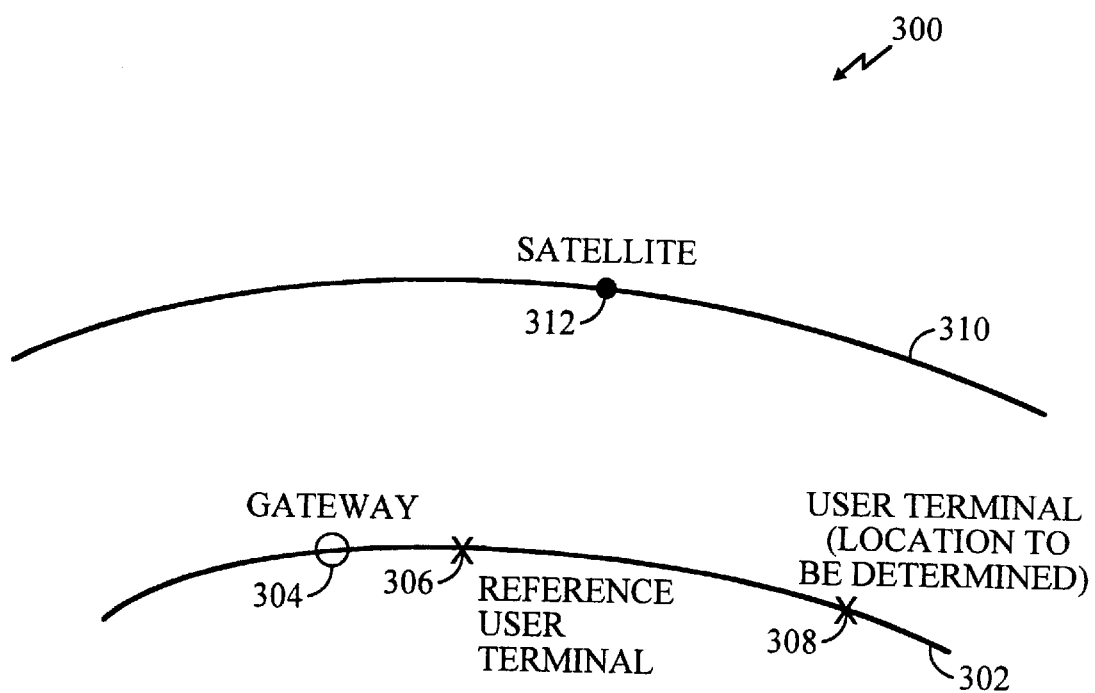
FIG. 3 is a diagram of an exemplary wireless communications system having a reference user terminal.

Fine positioning using a reference user terminal helps to mitigate bias errors that are common to both the reference user terminal and the user terminal in which position information is being determined. Such bias errors include, but are not limited to, satellite frequency error, satellite positioning error, and ionospheric effects. Ionospheric effects can change the delay of the signal. FIG. 3 is a diagram of an exemplary wireless communications system having a reference user terminal. Communications system 300 comprises, inter alia, a first curved line representing a partial circumference of the earth's surface 302 and a second curved line representing the orbital path 310 of a satellite 312. A gateway 304, a reference user terminal 306 and a second user terminal 308 are located on the earth's surface. The position of gateway 304, reference user terminal 306, and satellite 312 are known. Reference user terminal 306 is usually located near gateway 304. The position of second user terminal 308 is unknown.

Whenever satellite 312 is in the area of gateway 304, the position of both reference user terminal 306 and second user terminal 308 are determined using round trip delay and Doppler measurements. These measurements are taken on a periodic basis such as every few seconds, but are not taken so often as to consume one of the satellite resources. For reference user terminal 306, the actual Doppler and round trip delay measurements are known because the location of reference user terminal 306 is known. When the measured Doppler and round trip delay values are not equivalent to the known or actual values, frequency (f) and range (R) errors exist. The f and R errors are subtracted from the measurements received for second user terminal 308. Thus, bias errors common to both reference user terminal 306 and second user terminal 308 are mitigated. These are not all of the bias errors, but they represent a majority of the bias errors. Subtraction of the f and R errors from the measurements of second user terminal 308 provides differential correction that results in improved round trip delay and Doppler measurements for second user terminal 308.

Reduction in Bias Errors

The most severe source of bias error is user terminal velocity. If the user terminal moves, Doppler measurements will contain errors because the satellite Doppler is affected by the terminal motion. In general, for a user-initiated position call, the user is expected to stand or stay located in one position. A stationary user terminal eliminates the bias errors caused by user terminal velocity. When a user's position is requested by a third party, the user may not be standing in one position, due to lack of awareness by the user of the third party request.

A user's motion in single satellite positioning causes bias errors. When a user is moving in the same direction at approximately the same speed, repeated measurements enable the estimation of a user's velocity. For example, during extended measurements, a user moving from point A to point B will end up being positioned halfway between A and B. Bias errors for a user terminal traveling in one direction at a fixed velocity results in large bias errors of approximately one (1) kilometer per ten (10) kilometers/ hour of motion.

A user's motion in two-satellite positioning is not very critical. The solved position will correspond to the user terminal position at the middle of the measurement period. The weight given to Doppler measurements for two-satellite positioning is proportionately less than the weight given to range measurements. Since user terminal velocity affects the Doppler, and Doppler measurements are not given as much weight, Doppler measurements are not a large contributing factor to the resulting position data.

In single satellite positioning, user terminal positioning error, $\Delta X_{UT}$, due to satellite position error, $\Delta X_{SAT}$, obeys a fixed linear relationship to the satellite position error of:

$$\Delta X_{UT} \approx 2 * \Delta X_{SAT} * R_E / (R_E + h_{SAT}) \quad (1)$$

where $h_{SAT}$ is the satellite altitude and $R_E$ is the Earth's radius. User terminal position error due to satellite position error is initially relatively small. User terminal position error due to satellite position error will not decrease due to the $1/\sqrt{N}$ contribution, but will decrease when there is additional information in the changing geometry.

Bias position error due to satellite frequency error can be completely eliminated due to the option of not using Doppler measurements when there are enough well-spaced range measurements or reduced when Doppler measurements are given lower weight than the inverse of their variance. Bias position error due to satellite frequency error will not decrease due to the $1/\sqrt{N}$ contribution.

In single satellite positioning, bias position error due to satellite frequency error is initially large. Bias position error will decrease rapidly due to the diminishing role of Doppler as more range measurements are available. Bias position error will decrease even faster with lesser weight assigned to Doppler measurements. In two-satellite positioning, bias position error due to satellite frequency error is initially small and changes slightly with additional measurements.

Further reductions in the above-mentioned bias errors can be achieved by employing more accurate calibrations of the communications system, such as calibrating satellite frequency offset using round trip Doppler measurement to a reference user terminal, collocated with the gateway.

In single satellite positioning, the user terminal position error due to unaccounted for elevation is only in the across-track direction X. The across-track error $\Delta X$ obeys a linear relationship:

$$\Delta X \approx \Delta h * h_{SAT} / X \quad (2)$$

where $h_{SAT}$ is the satellite altitude, X is the distance from the user terminal to the satellite sub-track, and $\Delta h$ is the user terminal height error. $\Delta X$ will not decrease with extended measurements. $\Delta h$ can be reduced by using a more detailed topographic map at the gateway (120, 122, or 304).

In two-satellite cases, extended measurements allow the option of estimating the height. This increases the sensitivity to random measurement error, but eliminates the bias error due to user terminal height or elevation.

Determining User Terminal Location and An Estimate of the Error

The present invention employs two basic parameters to obtain accurate measurements of range and range-rate. The first parameter is the round trip delay (RTD) of a signal transmitted from a reference satellite to a user terminal and back to a gateway. The second parameter is the Doppler shift. RTD and Doppler shift are obtained by measuring the characteristics of communications signals exchanged between the user terminal and gateway through one or more satellites. RTD and Doppler shift, and the method used to determine the range and range-rate between a user terminal and one or more satellites are disclosed in the above-mentioned patent applications, which are incorporated by reference herein in their entireties.

The present invention uses a weighted Gauss-Newton least squares formula, defined below, to obtain user terminal position and estimated error. Range and range rate measurements are obtained from the gateway. At any given time, satellite position and velocity are known parameters. The least squares range formula is $$R = \sqrt{(X_{SAT} - X_{UT})^2 + (Y_{SAT} - Y_{UT})^2 + (Z_{SAT} - Z_{UT})^2} \quad (3)$$

where R is the range, $X_{UT}$, $Y_{UT}$, and $Z_{UT}$ represent the X, Y, and Z coordinates for the user terminal position, and $X_{SAT}$, $Y_{SAT}$, and $Z_{SAT}$ represent the X, Y, and Z coordinates for the satellite position. The least squares range rate formula is $$\dot{R} = \frac{(X_{SAT} - X_{UT})}{R} \cdot \dot{X}_{SAT} + \frac{(Y_{SAT} - Y_{UT})}{R} \cdot \dot{Y}_{SAT} + \frac{(Z_{SAT} - Z_{UT})}{R} \cdot \dot{Z}_{SAT} \quad (4)$$

where $\dot{R}$ is the range rate, $X_{UT}$, $Y_{UT}$, and $Z_{UT}$ represent the X, Y, and Z coordinates for the user terminal position, $X_{SAT}$, $Y_{SAT}$, and $Z_{SAT}$ represent the X, Y, and Z coordinates for the position of the satellite, and $\dot{X}_{SAT}$, $\dot{Y}_{SAT}$ and $\dot{Z}_{SAT}$ are the X, Y, and Z coordinates for the velocity of the satellite.

According to the method of the present invention, at any given satellite position, estimated range and range rate are determined using equations (1) and (2) above by using a best guess estimate ($X_{UT}$, $Y_{UT}$, and $Z_{UT}$) of where the user terminal is located. This best guess estimate uses known information to provide a best guess as to where the user terminal is located. For example, a previous known, last request, or usual home location, user terminal position can be used. When information is lacking, the gateway position is used as the best guess estimate for the user terminal position. Once the best guess estimate for the position of the user terminal is decided upon or selected, the best guess estimate can then be used to determine the estimated range, R, and estimated range rate, $\dot{R}$.

The present invention uses a least squares formula known as Gauss-Newton to determine the position of the user terminal. The basic Gauss-Newton formula is $$\theta_n = \theta_{n-1} + (H^T H)^{-1} H^T [M - \dot{M}(\hat{\theta})] \quad (5)$$

where $\theta_n$ is a vector representing the present position estimate of the user terminal, $\theta_{n-1}$ is a vector representing the previous position estimate of the user terminal, H is a partial derivative matrix, and M is a vector of measurements.

$$\theta_n = \begin{bmatrix} X \\ Y \\ Z \end{bmatrix} \quad (6)$$

The partial derivative matrix, H, is comprised of the partial derivatives of each measurement with respect to X, Y, and Z. Partial derivative matrix, H, indicates how much the measurement of R and Ṙ change as a function of X, Y, and Z at a particular geometry. Partial derivative matrix, H, shown in equation (7), contains the partial derivatives of the range measurements and the partial derivative of the range rate measurements. Partial derivative matrix, H, continues to grow as more measurements are taken. The subscript 2 in partial derivative matrix H may refer to a second satellite or it may refer to the same satellite at a different position.

$$H = \begin{bmatrix} \frac{\partial R_1}{\partial x} & \frac{\partial R_1}{\partial y} & \frac{\partial R_1}{\partial z} \\ \frac{\partial \dot{R}_1}{\partial x} & \frac{\partial \dot{R}_1}{\partial y} & \frac{\partial \dot{R}_1}{\partial z} \\ \frac{\partial R_2}{\partial x} & \frac{\partial R_2}{\partial y} & \frac{\partial R_2}{\partial z} \\ \frac{\partial \dot{R}_2}{\partial x} & \frac{\partial \dot{R}_2}{\partial y} & \frac{\partial \dot{R}_2}{\partial z} \end{bmatrix} \quad (7)$$

The vector of measurements, M, comprises or is formed from the measured values for range, R, and range rate, Ṙ. Vector of measurements, M, is shown in equation (8). Note that as more measurements are collected, vector M will also continue to grow.

$$M = \begin{bmatrix} R_1 \\ \dot{R}_1 \\ R_2 \\ \dot{R}_2 \end{bmatrix} \quad (8)$$

$\hat{M}(\hat{\theta})$ is the vector of estimated measurements.

Measurement in range, R, is more accurate than the measurement in range rate, Ṙ. To compensate for the levels of uncertainty in the measurements, different weights are applied using a weight matrix, W. Thus, weight matrix, W, takes into account quality of the measurements. Weight matrix, W, is a diagonal matrix with its elements being functions of the standard deviation of the measured range R and range rate Ṙ. Weight matrix, W, is:

$$W = \begin{bmatrix} \frac{1}{\sigma_{R_1}} & 0 & 0 & 0 \\ 0 & \frac{1}{\sigma^2_{\dot{R}_1}} & 0 & 0 \\ 0 & 0 & \frac{1}{\sigma_{R_2}} & 0 \\ 0 & 0 & 0 & \frac{1}{\sigma^2_{\dot{R}_2}} \end{bmatrix} \quad (9)$$

Weight matrix, W, is now applied to the Gauss-Newton formula of equation (3) to obtain the weighted Gauss-Newton formula. The weighted Gauss-Newton formula used to determine the position of a user terminal is:

$$\theta_n = \theta_{n-1} + (H^T W H)^{-1} W H^T [M - \hat{M}(\hat{\theta})] \quad (10)$$

The weighted Gauss-Newton formula allows for the accumulation of measurements before determining a position.

To determine when the specified accuracy of the measurement has been achieved, an estimate of expected error for a given geometry with a given accuracy of measurement is determined. The estimate of expected error matrix, G, is:

$$G = (H^T W H)^{-1} \quad (11)$$

The relationship for the total error is:

$$Err_{TOT} = \sqrt{X^2 Err + Y^2 Err + Z^2 Err} = \sqrt{G_{11} + G_{22} + G_{33}} \quad (12)$$

where $X_{err}$, $Y_{err}$, and $Z_{err}$ represent the coordinates of the total error and $G_{11}$, $G_{22}$, and $G_{33}$ are the diagonals of the G matrix.

Method of Accumulating Data Before Determining Position

The method of the present invention is an iterative process that begins with an initial first guess of the position of the user terminal in question and then converges to a solution. As previously stated, position estimates are based on a weighted Gauss-Newton least squares estimate. Before performing an initial determination of the location of a user's position in a satellite communications system, the system waits until a pre-selected number of measurements have accumulated. For example, five, six, or seven measurements are usually taken before the initial determination is made. After the desired number of measurements have accumulated (five, six, or seven), a position estimate and an error estimate is determined. If the error estimate is not below a threshold value, such as a threshold value of 100 or 200 meter error, the system continues to accumulate more measurements and then repeats the determination of position and error estimates using all of the accumulated data. Repeated determinations of position and error estimates require a first guess for the position of the user terminal in question. The first guess for each repeat determination is the position estimate from the previous determination. The above process of accumulating measurements and then determining position and error estimates using all of the accumulated data continues until either the error estimate is below the threshold value or a position call time frame (allowed or desired interval) has elapsed.

For example, five measurements are collected. After the fifth measurement, position and error estimates are determined. The error estimate is greater than the threshold value. Therefore, five additional measurements are taken. After the tenth measurement (that is, five from the first collection and five from the second collection) is obtained, position and error estimates are determined using all ten measurements. The resulting error estimate is greater than the threshold value. Thus, five additional measurements are taken. After the fifteenth measurement is obtained, position and error estimates are determined using all fifteen measurements. The resulting error estimate is now less than the threshold, causing the process to end.

Alternatively, the system could determine position and error estimates after each measurement and then average the position estimates to obtain a final position. By employing this alternative method, when a single satellite positioning converts to a two-satellite positioning, the system will provide single satellite positioning and then average the results.

By using the preferred method of accumulating all of the measurements together, the system effectively operates using two-satellite positioning. Two satellite positioning is better than single satellite positioning.

Method for Providing Position Information

Figure 4:
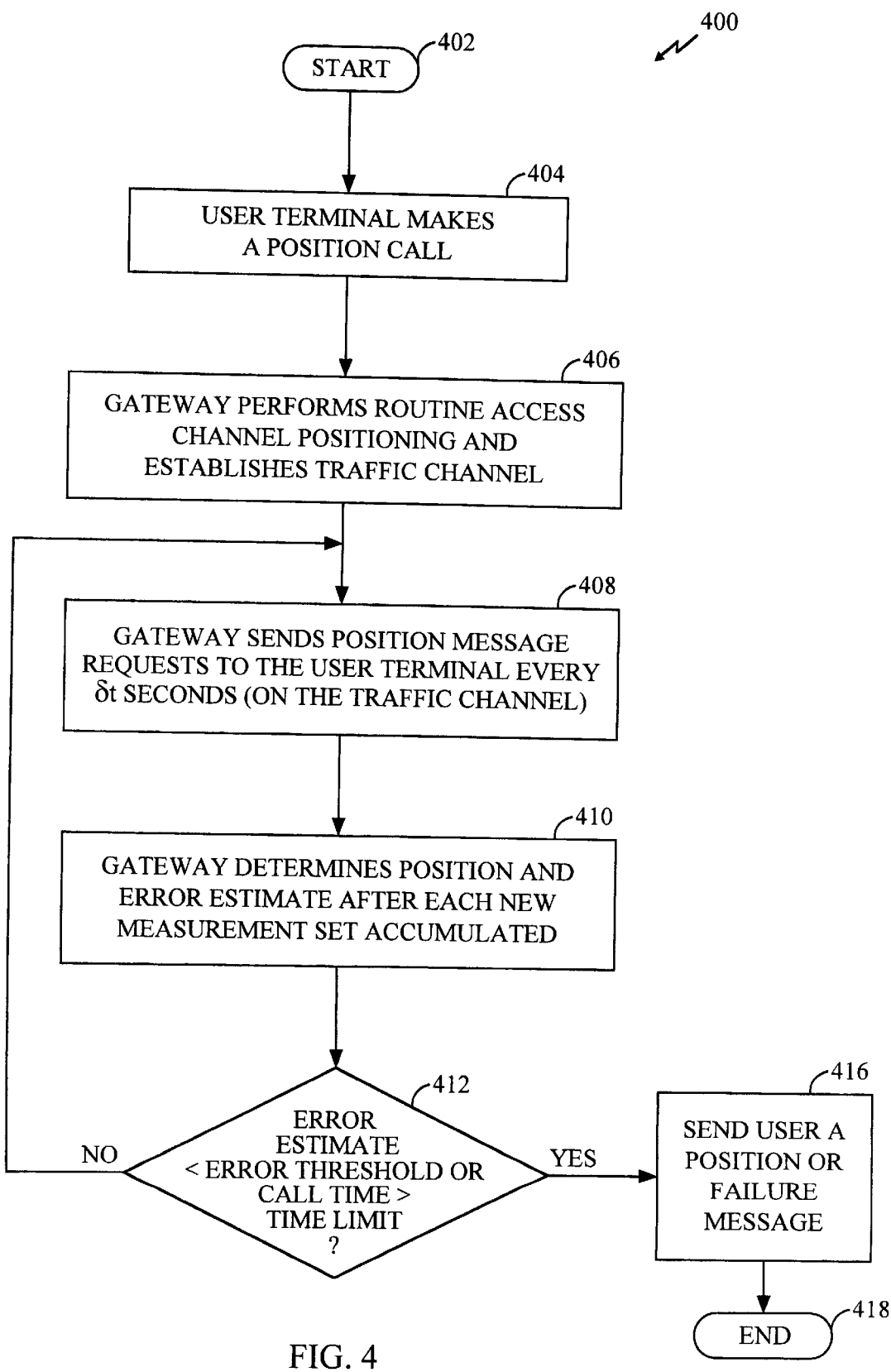
FIG. 4 is a flow diagram illustrating a method for providing position information to a user making a position call according to an embodiment of the present invention.

FIG. 4 is a flow diagram illustrating a method for providing position information to a user making a position call. The steps of the method illustrated in FIG. 4 may be implemented in hardware, firmware, software, or a combination thereof.

The process begins with step 402, and proceeds to step 404. In step 404, a user having a user terminal, such as a mobile telephone, makes a position call. A position call can be made by either pressing a specific button or set of buttons dedicated to position calling or dialing a position call number or code. In some communication systems, position calls can be a pre-selected or programmed service, option, or feature assigned to the user terminal, and may, therefore, occur automatically when the user terminal is activated. For example, this feature could be useful for automotive applications or automated emergency service request transmitters. Processing then proceeds to step 406.

In step 406, the gateway performs routine Access channel positioning and establishes a Traffic channel. The process then proceeds to step 408.

In step 408, the gateway sends position message requests to the user terminal every $\delta t$ seconds (on the traffic channel). Each position request by the gateway yields the following measurements:

For single satellite positioning, RTD and Doppler shift.

For two satellite positioning, RTD, Doppler shift, $\Delta t$, and $\Delta f$ where RTD is round trip delay, $\Delta t$ is the range delay difference between the two satellites, and $\Delta f$ is the Doppler difference between the two satellites. For single satellite positioning, $\delta t=10$ seconds. For two satellite positioning, $\delta t=1$ second. Other values for $\delta t$ for both single satellite positioning and two-satellite positioning may be used without departing from the scope of the present invention. Processing then proceeds to step 410.

In step 410, the gateway determines a position and error estimate. Position determinations utilize all accumulated measurements. Processing then proceeds to decision step 412.

In decision step 412, it is determined whether or not the estimated error is less than an error threshold level or call time is greater than time limit. The error threshold level is usually set at 100. Other values for error threshold level, such as 125, 200, or 300 could be used without departing from the scope of the present invention. Call time is the time (generally in seconds) that has transpired since the position call was made. The time limit for a position call is 120 seconds. If it is determined that the estimated error is less than the error threshold level or that the call time is greater than the time limit, Processing then proceeds to step 416. If it is determined that the estimated error is greater than or equal to the error threshold level or that the call time is less than or equal to the time limit, Processing then proceeds back to step 408 to obtain additional measurements.

In step 416, a position message or a failure message is sent to the user. A position message is a message that indicates the user's position and the error estimate. A failure message is sent if the error estimate obtained within the time limit is above the threshold. A failure message will also be generated if an obscured satellite causes an unexpected failure. For such an error, the failure message may read: Unfavorable satellite constellation—please retry in 2 minutes. In the case of a 911 emergency call, the previously determined position and error estimate will be delivered to the user even if above the threshold level. Processing then proceeds to step 418 where the process ends.

Environment

The present invention may be implemented using hardware, software or a combination thereof and may be implemented using a computer system, dedicated programmable controller, or other processing system. The invention may be implemented primarily in hardware using, for example, hardware components such as application specific integrated circuits (ASICs) or Digital Signal Processors (DSPs). Implementation of a hardware state machine so as to perform the functions described herein will be apparent to persons skilled in the relevant art(s). In yet another embodiment, the invention is implemented using a combination of both hardware and software. Given the flow chart and description provided herein, a skilled programmer would be able to easily program a wireless telephone processor system to accomplish the tasks of this invention.

Conclusion

The previous description of the preferred embodiments is provided to enable any person skilled in the art to make or use the present invention. While the invention has been particularly shown and described with reference to preferred embodiments thereof, it will be understood by those skilled in the art that various changes in form and detail may be made therein without departing from the spirit and scope of the invention. Thus, the breadth and scope of the present invention should not be limited by any of the above-described embodiments, but should be defined only in accordance with the following claims and their equivalents.

What I claim as the invention is:

1. A method for determining the position of a user terminal in a satellite communications system, comprising the steps of:
repetitively measuring the characteristics of communication signals exchanged between said user terminal and a gateway through one or more satellites, wherein all of the repetitive measurements are accumulated; and
combining the accumulated measurements to produce a position estimate, thereby mitigating the effects of random errors in the measurements.

2. The method of claim 1, wherein said step of repetitively measuring the characteristics of communication signals further comprises the step of waiting for a gateway-satellite-user terminal geometry to change between measurements when only one satellite is available, thereby mitigating the effect of an unfavorable gateway-satellite-user terminal geometry when unfavorable geometries exist, mitigating the effect of bias errors, and mitigating ambiguity effects.

3. The method of claim 1, further comprising the step of estimating a theoretical expected error, wherein said expected error is a function of an expected measurement error and geometry.

4. The method of claim 1, wherein the mitigating effect of random errors in the measurements is inversely proportional to the square root of the number of measurements taken.

5. The method of claim 1, wherein a position call is received prior to said step of repetitively measuring the characteristics of communication signals.

6. The method of claim 1, wherein said measuring step and said combining step are an iterative process, wherein said iterative process begins with a first guess of an estimated position and converges to a solution.

7. The method of claim 6, wherein an initial first guess of said estimated position is based on the position of a gateway and said first guess for each additional iteration is the last said position estimate.

8. The method of claim 1, wherein said position estimate is based on a weighted least square estimate.

9. The method of claim 1, wherein said accumulated measurements include single satellite positioning measurements, two satellite positioning measurements, and first and second single satellite positioning measurements, wherein a first satellite transfers responsibility of obtaining measurements to a second satellite.

10. The method of claim 1, further comprising the step of mitigating bias errors common to all user terminals, such as ionospheric errors, satellite frequency errors, and satellite position errors, using a reference UT, wherein said reference UT has a known location near a gateway.

11. The method of claim 5, wherein said position call is initiated by one of a user and a third party.

12. The method of claim 9, wherein said position estimate is based on range and Doppler measurements for single satellite positioning and range, Doppler, range difference between two satellites, and Doppler difference between two satellites for two satellite positioning.

13. The method of claim 9, wherein said position estimate is based on range and Doppler measurements for said first satellite and range and Doppler measurements for said second satellite.

14. The method of claim 3, further comprising the step of terminating said measuring and combining steps when said theoretical error is less than a determined threshold value; and reporting said estimated position results to the user.

15. The method of claim 5, further comprising the step of terminating said measuring and combining steps when said position call exceeds a maximum length; and reporting said estimated position results to the user.

16. The method of claim 15, wherein said maximum length is two minutes.

17. A system for determining the position of a user terminal in a satellite communications system, comprising:

means for repetitively measuring the characteristics of communication signals exchanged between said user terminal and a gateway through one or more satellites, wherein all of the repetitive measurements are accumulated; and means for combining the accumulated measurements to produce a position estimate, thereby mitigating the effects of random errors in the measurements.

18. The system of claim 17, wherein said means for repetitively measuring the characteristics of communication signals further comprises means for waiting for the gateway-satellite-user terminal geometry to change between measurements when only one satellite is available, thereby mitigating the effect of an unfavorable gateway-satellite-user terminal geometry when unfavorable geometries exist, mitigating the effect of bias errors, and mitigating ambiguity effects.

19. The system of claim 17, further comprising means for estimating a theoretical expected error, wherein said expected error is a function of an expected measurement error and geometry.

20. The system of claim 17, wherein the mitigating effect of random errors in the measurements is inversely proportional to the square root of the number of measurements taken.

21. The system of claim 17, wherein said means for measuring and said means for combining include means for providing an iterative process, wherein said iterative process includes a first guess of an estimated position.

22. The system of claim 21, wherein an initial first guess of said estimated position is based on the position of a gateway and said first guess for each additional iteration is the last said position estimate.

23. The system of claim 17, wherein said position estimate is based on a weighted least square estimate.

24. The system of claim 17, wherein said accumulated measurements include single satellite positioning measurements, two satellite positioning measurements, and first and second single satellite positioning measurements, wherein a first satellite transfers responsibility of obtaining measurements to a second satellite.

25. The system of claim 17, further comprising means for mitigating bias errors common to all user terminals, such as ionospheric errors, satellite frequency errors, and satellite position errors, using a reference UT, wherein said reference UT has a known location near a gateway.

26. The system of claim 24, wherein said position estimate is based on range and Doppler measurements for single satellite positioning and range, Doppler, range difference between two satellites, and Doppler difference between two satellites for two satellite positioning.

27. The system of claim 17, wherein said position estimate is based on range and Doppler measurements for said first satellite and range and Doppler measurements for said second satellite.

28. The system of claim 19, further comprising means for terminating said measuring and combining means when said theoretical error is less than a determined threshold value; and means for reporting said estimated position results to the user.

* * * * *